3,391,054

POLYURETHANE BASED ADHESIVE SYSTEMS AND LAMINATES PREPARED THEREWITH

Armand Francis Lewis and Louis Michael Zaccardo, Fairfield, and Arthur Maurice Schiller, Stamford, Conn., assignors to American Cyanamid Company, Stamford, Conn., a corporation of Maine No Drawing. Continuation-in-part of application Ser. No. 380,914, July 7, 1964. This application Aug. 24, 1966, Ser. No. 574,569
9 Claims. (Cl. 161—186)

ABSTRACT OF THE DISCLOSURE

Adhesive compositions composed of a polyurethane resin, a diamine curing agent, a mono or diglycidyl ester or ether and an expoxy silane are disclosed.

This application is a continuation-in-part of our copending application, Ser. No. 380,914, filed July 7, 1964 and now abandoned.

This invention relates to a novel adhesive composition and structures produced therewith. More particularly, this invention relates to a novel adhesive composition comprising a uniform mixture of (1) a polyurethane resin, (2) a diamine curing agent, (3) ad diglycidyl ester, a diglycidyl ether, a monoethylenically unsaturated monoglycidyl ether or a monoethylenically unsaturated monoglycidyl ester and (4) an epoxy silane. Still more particularly, this invention relates to novel adhesive compositions having increased water-resistance which are composed of (1) a polyurethane resin, either polyester based or polyether based, (2) a diamine curing agent, (3) a diglycidyl ester, a diglycidyl ether, a monoethylenically unsaturated monoglycidyl ester or a monoethylenically unsaturated monoglycidyl ether, and (4) an epoxy silane, with or without (5) a polyethylenically unsaturated compound and structures produced therewith.

Previous to our invention, adhesives composed of polyurethane resins, catalysts, glycidyl-containing esters and ethers and curing agents useful for metal to metal bonding have been known. Although excellent for many applications, these prior art adhesives have been deficient in that they have not had the lap shear strength, peel strength and water-resistance properties necessary to allow their usage in some fields. We have now discovered that these known prior art adhesive compositions can be improved in water-resistance by the incorporation of an epoxy silane into the adhesive composition. Additionally, the lap shear strength and peel strength of the adhesives can be improved by the addition of a polyvinyl monomer thereto. We have found that the incorporation of these compounds into the polyurethane resin adhesive composition increases the water-resistance in room temperature water almost 100 fold and in boiling water up to 24 fold, and even higher. It was indeed surprising that these results would be accomplished in view of the relatively small amounts of epoxy silane added.

It is therefore an object of the present invention to provide novel adhesive compositions.

It is a further object of the present invention to provide novel adhesive compositions comprising uniform mixtures of (1) a polyurethane resin, (2) a diamine curing agent, and (3) a diglycidyl ester, a diglycidyl ether, a monoethylenically unsaturated glycidyl ester or a monoethylenically unsaturated glycidyl ether and (4) an epoxy silane, with or without (5) a polyethylenically unsaturated compound.

These and other objects will become more apparent to one skilled in the art upon reading the more detailed description set forth hereinbelow.

The polyurethanes

Any polyester based or polyether based polyurethane resin may be used in producing the novel adhesives of the present invention. Among the reactive organic polyfunctional polyols employed in preparing one class of polyurethane resins used in the practice of our invention by reaction with a suitable isocyanate compounds are the polyalkylene ether, thioether, and ether-thioether glycols represented by the general formula $$\text{(I)} \qquad HO—(RX)_n—H$$

wherein R represents the same or different alkylene radicals containing up to about 10 carbon atoms, X represents oxygen or sulfur, and $n$ is an integer large enough so that the molecular weight of the polyalkylene ether, thioether, or ether-thioether glycol is at least about 500, e.g., from about 500 to about 10,000. The polyalkylene ether glycols included within this general formula, such as polyethylene glycols, polypropylene glycols, polybutylene glycols, polytetramethylene glycols, polyhexamethylene glycols, and the like, which are obtained, for example, by acid-catalyzed condensation of the corresponding monomeric glycols or by the condensation of lower alkylene oxides, such as ethylene oxide, propylene oxide, and the like, either with themselves or with glycols such as ethylene glycol, propylene glycol, and the like, are preferred.

Polyalkylenearylene ether, thioether and ether-thioether glycols which also have molecular weights ranging from about 500 to about 10,000 but which differ from the above-described polyalkylene glycols in having arylene radicals, such as phenylene, naphthylene and anthrylene radicals, either unsubstituted or substituted, e.g., with alkyl or aryl groups, and the like, in place of some of the alkylene radicals of said polyalkylene glycols may also be employed. Polyalkylenearylene glycols of the type ordinarily used for this purpose will usually contain at least one alkylene ether radical having a molecular weight of about 500 for each arylene radical present.

Essentially linear polyesters containing a plurality of isocyanate-reactive hydroxyl groups constitute another class of reactive organic polyfunctional polyols which may be employed in preparing polyurethane resins useful in the practice of the present invention. While the preparation of polyesters suitable for this purpose has been described in great detail in the prior art and forms no part of the present invention per se, it may be mentioned here by way of illustration that polyesters of this type may be prepared by the condensation of a polyhydric alcohol, generally a saturated aliphatic diol such as ethylene glycol, propanediol-1,2, propanediol-1,3, butanediol-1,3, butanediol-1,4, pentanediol-1,2, pentanediol-1,5, hexanediol-1,3, hexanediol-1,6, diethylene glycol, dipropylene glycol, triethylene glycol, tetraethylene glycol, and the like, as well as mixtures of such diols with each other and with minor amounts of polyols having more than two hydroxyl groups, preferably saturated aliphatic polyols such as glycerol, trimethylol ethane, trimethylol propane, pentaerythritol, sorbitol, and the like, with a polycarboxylic acid or anhydride, generally a dicarboxylic acid or anhydride which is either saturated or which contains only benzenoid unsaturation, such as oxalic, malonic, succinic, glutaric, adipic, pimelic, suberic, azelaic, sebacic, malic, phthalic, cylohexanedicarboxylic and endomethylenetetrahydrophthalic acids, and the like and their isomers, homologs, and other substituted derivatives, e.g., chloro-derivatives, or with mixtures of such acids with each other and with unsaturated dicarboxylic acids or anhydrides such as maleic, fumaric, citraconic and itaconic acids, and the like, as well as with polycarboxylic acids containing three or more carboxyl groups, such as aconitic acid and the like.

The essentially linear polyesters commonly used in preparing polyurethane resins preferably have molecular weights ranging from about 750 to about 3,000. In addition, they will generally have relatively low acid numbers, e.g., acid numbers not appreciably in excess of about 60 and preferably as low as can be practicably obtained, e.g., 2 or less. Correspondingly, they will generally have relatively high hydroxyl numbers, e.g., from about 30 to about 700. When preparing these polyesters, an excess of polyol over polycarboxylic acid is generally used to insure that the resulting essentially linear polyester chains contain a sufficient amount of reactive hydroxyl groups.

Another class of suitable organic polyfunctional polyol reactants includes polyalkylene ether polyols containing more than two reactive hydroxyl groups, such as polyalkylene ether triols, tetrols, and the like, which are prepared, for example, by reacting polyols such as glycerol, trimethylol ethane, trimethylol propane, pentaerythritol, dipentaerythritol, sorbitol and the like, with lower alkylene oxides such as ethylene oxide, propylene oxide and the like.

Nitrogen-containing polyfunctional polyols may also be used as polyol reactants. Among such materials there are included the polyesteramides conventionally employed in the preparation of polyurethane resins, i.e., those having molecular weights ranging from about 750 to about 3,000, acid numbers ranging from about 60 as a maximum to as low as can be practicably obtained, e.g., 2 or less, and hydroxyl numbers ranging from about 30 to about 700, and also high molecular weight polyamino alcohols, such as hydroxypropylated alkylene diamines of the general formula

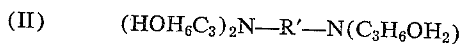

(II) $(HOH_6C_3)_2N—R'—N(C_3H_6OH_2)$ wherein R' represents an alkylene radical having from 2 to 6 carbon atoms, inclusive, of which N,N,N',N'-tetrakis(2-hydroxypropyl)-ethylenediamine is representative species, as well as higher analogs thereof, such as hydroxypropylated polyalkylenepolyamines of the general formula

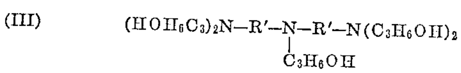

(III) $(HOH_6C_3)_2N—R'—N(C_3H_6OH)—R'—N(C_3H_6OH)_2$ wherein R' is as defined hereinabove (see U. S. Patent No. 2,697,118 to Lundsted et al).

As can be readily appreciated, mixtures of the various reactive organic polyfunctional polyols described hereinabove may also be employed in preparing polyurethane resins useful in the practice of the present invention.

Just as in the case of the polyol reactant, polyurethane resins may be prepared using a wide variety of organic polyisocyanates, among which there are included aromatic diisocyanates, such as m-phenylenediisocyanate, p-phenylenediisocyanate, 4-t-butyl - m - phenylenediisocyanate, 4-methoxy-m-phenylenediisocyanate, 4-phenoxy-m-phenylenediisocyanate, 4-chloro - m - phenylenediisocyanate, toluenediisocyanates (either as a mixture of isomers, e.g., the commercially avialable mixture of 80% 2,4-toluenediisocyanate and 20% 2,6-toluenediisocyanate, or as the individual isomers themselves), m - xylylenediisocyanate, p - xylylenediisocyanate, cumene - 2,4 - diisocyanate, durenediisocyanate, 1,4-naphthylenediisocyanate, 1,5 - naphthylenediisocyanate, 1,8 - naphthylenediisocyanate, 2,6-naphthylenediisocyanate, 1,5-tetrahydronaphthylenediisocyanate, p,p'-diphenylenediisocyanate, diphenylmethane - 4,4'-diisocyanate, 2,4-diphenylhexane-1, 6-diisocyanate, "bitolylenediisocyanate" (3,3'-dimethyl-4,4' - biphenylenediisocyanate), "dianisidinediisocyanate" (3,3' - dimethoxy-4,4' - biphenylenediisocyanate), and polymethylenepolyisocyanates represented by the general formula (IV)

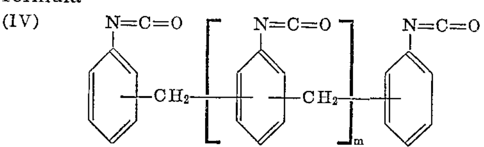

wherein $m$ represents an integer between 0 and about 5, and the like; aliphatic diisocyanates, such as methylenediisocyanate, ethylenediisocyanate, the tri-, tetra-, penta-, hexa-, hepta-, oct-, non- and decamethylene-$\omega,\omega'$-diisocyanates, 2 - chlorotrimethylenediisocyanate, 2,3 - dimethyltetramethylenediisocyanate, and the like, and tri- and higher isocyanates, such as benzene-1,3,5-triisocyanate, toluene - 2,4,6 - triisocyanate, diphenyl - 2,4,4'-triisocyanate, triphenylmethane-4,4',4''-triisocyanate, and the like. Mixtures of two or more of such organic polyisocyanates may also be employed to prepare the polyurethane resins by reaction with the ethers and esters described above utilizing procedures well known to those skilled in the art, see for example, U.S. Patents 2,729,618, 3,016,364 and the like.

Examples of these known polyurethane production procedures include the so-called "pre-polymer" technique, as commonly practiced in the production of polyurethane resins, which involves mixing polyol and polyisocyanate under substantially anhydrous conditions, i.e., with usually not more than about 0.2% by weight of water, based on the total weight of the mixture, being present, and with a molar excess of the polyisocyanate over the polyol usually being employed, reacting this mixture at a temperature ranging from about room temperature to about 100° C. for from about 20 minutes to about 8 hours, and then cooling the resulting "prepolymer" to a temperature of from about room temperature to about 60° C.

Furthermore, particulate or fibrous fillers, such as chopped $\alpha$-cellulose, asbestos, or glass fibers, and the like, conventional fire-retarding additives, for example, phosphates such as triphenyl phosphate, tricresyl phosphate, tris(2,3-dibromopropyl)phosphate, tris($\beta$-chloroethyl)phosphate, and the like, dyes or pigments, e.g., silica pigments, stabilizers, and the like may be added to the polyurethane resins.

Modifications and changes which may be made in conventional polyurethane reaction mixtures to provide resins having various degrees of flexibility, rigidity and other properties are so well known in the art that no more than a brief mention of some of them need be made here. Thus, in addition to those previously indicated, i.e., using essentially linear polyesters and polyesteramides having certain specified molecular weights, acid numbers and hydroxyl numbers and varying the mol ratio of polyisocyanate to polyol, numerous other modifications, such as using tri- or higher functional monomeric polyols or polycarboxylic acids in preparing the polyol reactant, using tri- or higher functional polyisocyanates, and the like, have been disclosed in the prior art to the accomplishment of these ends. It is contemplated that any or all of these modifications, together with any other manipulative steps described in prior art processes for the preparation of polyurethane resins may be appropriated to the practice of the present invention.

The glycidyl additives

The diglycidyl ethers, diglycidyl esters, monoethylenically unsaturated monoglycidyl ethers, and monoethylenically unsaturated monoglycidyl esters which are useful in producing the adhesive compositions encompassed by the present invention include such materials as glycidyl methacrylate, glycidyl acrylate, allyl glycidyl ether, diglycidyl phthalate, glycidyl benzyl acrylamide, the diglycidyl ether of 2,2-bis(p-hydroxyphenyl)propane and other aryl or alkyl diglycidyl esters and ethers and monoethylenically unsaturated monoglycidyl ethers and esters known to those skilled in the art. We have found that amounts of diglycidyl ether, diglycidyl ester, monoethylenically unsaturated monoglycidyl esters or monoethylenically unsaturated monoglycidyl ethers added to the polyurethane polymer are critical and, as such, ratios of from about 1:2 parts to about 1:16 parts of the esters or ethers to the polyurethanes, respectively, should be employed, with amounts from about 1:4 parts to 1:10 parts being preferred.

The curing agents

For purposes of this invention, it is possible to incorporate any diamine curing agent into the polyurethane resins, including those in prepolymer form, obtained as set forth hereinabove. The diamine curing agents utilized include for example, the alkyl and aryl diamines, such as hexamethylenediamine, 4,4′-diaminodiphenylmethane, benzidene and its derivatives, p-phenylenediamine, 4,4′-diamino - 3,3′ - dimethyldiphenylmethane, 4,4′ - diamino-3,3′ - dimethoxydiphenylmethane, 3,3′ - dichlorodiaminodiphenylmethane and the like. A preferred group of compounds are those designated as the diaminodihalodiaryls of which 2,2′-methylene-bis-2-orthochloroaniline is an example. The diamines are incorporated into the urethane prepolymer syrups or added to the adhesive composition as such, in amounts ranging from about 25% to about 200%, preferably about 40% to about 160%, of the stoichiometric equivalent of polyurethane, based on its isocyanate group (NCO) content.

The epoxysilanes

As mentioned above, we have found that the incorporation of an epoxysilane into the compositions of the present invention materially increases the water-resistance thereof. The epoxysilanes may be added to the compositions in amounts ranging from about 0.1% to about 10.0%, preferably about 0.5% to about 5.0%, based on the total weight of the adhesive composition. The epoxysilane may be added at any time, that is to say, before, with or after the diamine curing agent and the glycidyl additive. The epoxysilane cannot be added, however, after the complete curing of the composition. The above concentration of epoxysilane is critical, in that at higher concentrations the final cured adhesive does not have the necessary strength characteristics and at lower concentrations no material increase in water-resistance is observed.

Any epoxysilane may be used to form the novel compositions of the invention, the glycidoxyalkyltrialkoxysilanes such as gamma - glycidoxypropyltrimethoxysilane and beta-3,4-(epoxycyclohexyl)ethyltrimethoxysilane being exemplary and preferred. Other epoxysilanes known to those skilled in the art may also be used such as those disclosed in U.S. Patent No. 2,946,701 and British Patent No. 834,326, which patents are hereby incorporated herein by reference.

The epoxysilanes may be produced by any method known in the art. Generally, one such procedure comprises reacting an appropriately substituted silane with an unsaturated glycidyl ether, such as, for example, reacting trimethoxysilane with allyl glycidyl ether, in the presence of a platinum catalyst at elevated temperatures to produce gamma-glycidoxypropyltrimethoxysilane.

The polyethylenically unsaturated compounds

The polyethylenically unsaturated compounds which may or may not be used in our novel adhesive compositions are, as mentioned previously, incorporated therein in order to increase the peel strength thereof. Although the peel strength of our adhesives without these additives is acceptable for many commercial purposes, we have found that a material increase in peel strength may be realized by the incorporation of these unsaturated compounds. The compounds are added to the adhesives in amounts of up to about 20.0%, preferably from about 0.1% to about 8.0%, by weight, based on the total weight of the compositions.

Examples of compounds which may be used for this purpose include tetraallyl melamine, trimethylolpropanetrimethacrylate, divinyl benzene, triallylphosphate, triallylamine, ethyleneglycol dimethacrylate, diallyphthalate, diallylisophthalate, 1,4-di(vinyloxy)butane and the like.

The manner in which the ingredients of our novel compositions are incorporated is not critical and they may be added in any combination or singularly without varying from the scope of the present invention. We have found, however, that generally it is preferable to premix the diamine curing agent, the epoxysilane, the polyvinyl compound and the mono- or diglycidyl ether or ester and add to this mixture at room temperature the polyurethane. However, such a procedure is not critical and it is within the scope of the present invention to mix the epoxysilane with the polyurethane resin first and then add the mono- or diglycidyl ester or ether, the curing agent and the polyvinyl compound or either the curing agent or polyvinyl compound can first be added to the polyurethane and then the epoxysilane and the ester or ether.

The use of catalysts in the novel compositions of the present invention is not critical, however, we have found that any free-radical generating catalyst may be incorporated into the compositions in order to obtain a faster rate of cure etc. especially at room temperature. Catalysts which are exemplary of this class include [2,5-dimethyl-2,5-di(t-butylperoxy)hexane], t-butyl perbenzoate, dicumyl peroxide, benzoyl peroxide, azobisisobutyronitrile, the dialkyl peroxides, e.g., diethyl peroxide, the alkyl hydrogen peroxides, e.g., t-butylhydrogenperoxide, symmetrical diacyl peroxides, e.g., acetyl peroxide, and the like in amounts ranging from about 0.1% to about 3.0%, preferably about 1.0% to about 2.0%, by weight, based on the weight of the monoglycidyl ester or ether added.

Our novel compositions allow those skilled in the art to bond materials such as steel, aluminum and other metals, wood, paper, plastics, leathers and the like together so as to create a permanent bond with high peel strength.

The following examples are set forth for purposes of illustration only and are not to be construed as limitations on the present invention except as set forth in the appended claims.

Example 1

To three parts of glycidyl methacrylate are added one part of finely pulverized 3,3′-methylenebisorthochloroaniline and 0.35 part of gamma-glycidoxypropyltrimethoxysilane in a suitable vessel. The vessel is warmed to 70° C. to dissolve the ingredients and cooled to room temperature. To the resultant mixture are then added 12 parts of a polyester based (90/10 ethyleneglycol/propylene glycol adipate) commercially available polyurethane resin and 0.01 part of 2,5-dimethyl-2,5-di(t-butylperoxy)n-hexane as a catalyst with stirring. The resultant composition is blended into a smooth paste and applied to two plates, one of carbon steel and one of stainless steel, measuring 6″ x 11″. The sandwich is placed in a press and heated to 105° C., at a pressure of 170 p.s.i., for one hour, at 158° C. for a second hour, and at 80° C. for 15 hours. The results obtained upon subjection of the resultant bonded metal plate to tests designed to indicate peel strength and water resistance are set forth in Table I, below.

Example 2

Following the procedure of Example 1, except that an equivalent amount of a polyether based (polytetramethylene type) commercially available polyurethane resin is used, two steel plates are bonded together with the resultant adhesive and subjected to water resistance and peel strength tests. The results are set forth below in Table I.

Example 3

Again following the procedure of Example 1, the same ingredients are blended together with an additional ingredient, 0.65 part of tetraallyl melamine. The resultant adhesive composition is used to bond two steel plates together. Upon curing the bonded plates are subjected to identical water resistance and peel strength tests. Results are shown below in Table I.

TABLE I

| | Original Peel Strength, p.p.i. at 25° C. | Delamination Time[1] | |
|---|---|---|---|
| | | Boiling Water | Room Temp., Water |
| Example: | | | |
| 1 | 34 | 24 hours | 2 months. |
| 2 | 30 | do | Do. |
| 3 | 52 | do | Do. |

[1] Failure occurs when peel strength drops to 10% of original value.

Following the procedures of Examples 1–3, various diglycidyl esters and ethers and monoethylenically unsaturated monoglycidyl esters and ethers, various curing agents and various polyvinyl compounds are added to various commercially available polyurethane resins. The results are set forth hereinbelow in Table II.

TABLE II

| Ex. | PU of Ex. | Ester or Ether | Curing Agent | PEU Compound | Epoxy-Silane | Original Peel St., p.p.i. at 25° C. | Delamination Time[1] | |
|---|---|---|---|---|---|---|---|---|
| | | | | | | | 212° C., $H_2O$ | 23° C., $H_2O$ |
| 4 | 1 | GMA[2] | MOCA | TPTM | GPTS | 55 | 24 hr | 2 mos. |
| 5 | 1 | GMA | MOCA | DVB | GPTS | 60 | 24 hr | 2 mos. |
| 6 | 1 | GMA | MOCA | | | 50 | 1 hr | 16 hr. |
| 7 | 2 | DGEP[3] | MOCA | TAA | GPTS | 56 | 20 hr | 1½ mos. |
| 8 | 1 | GMA[4] | MDA | DAP | GPTS | 53 | 24 hr | 2 mos. |
| 9 | 1 | AGE | PDA | TAP | GPTS | 70 | 20 hr | 2 mos. |
| 10 | 2 | GMA[3] | MOCA | DAI | GPTS | 55 | 20 hr | 2 mos. |
| 11 | 1 | GBA | MDA | | | 50 | 2 hr | 8 hr. |
| 12 | 2 | DGP | MOC | | GPTS | 60 | 22 hr | 1½ mos. |
| 13 | 2 | GMA | MOCA | TPTM | GPTS | 58 | 22 hr | 1½ mos. |
| 14 | 1 | GA[3] | MOCA | EGD | GPTS | 75 | 24 hr | 2 mos. |
| 15 | 2 | GMA | MDA | | GPTS | 45 | 24 hr | 2 mos. |
| 16 | 1 | GMA[5] | MOCA | TPTM | GPTS | 70 | 48 hr | 6 mos. |
| 17 | 2 | GMA | MOCA | TPTM | EETS | 63 | 48 hr | 3 mos. |

[1] Same as Table I.
[2] No catalyst.
[3] 16/1 polyurethane to GMA ratio.
[4] 2/1 polyurethane to GMA ratio.
[5] 9/1 polyurethane to GMA ratio.

CODE FOR TABLE II

GMA=glycidyl methacrylate
DGEP=the diglycidyl ether of 2,2-bis(p-hydroxyphenyl) propane
AGE=allyl glycidyl ether
GBA=glycidoxy benzyl acrylamide
DGP=diglycidyl phthalate
GA=glycidyl acrylate
MOCA=4,4′-methylene-bis-2-orthochloroaniline
MDA=4,4′-diaminodiphenylmethane
PDA=p-phenylene diamine
DVB=divinyl benzene
GPTS=gammaglycidoxypropyltrimethoxysilane
TPTM=trimethylolpropane trimethacrylate
TAA=triallylamine
DAP=diallylphthalate
TAP=triallylphosphate
DAI=diallylisophthalate
EGD=ethyleneglycol dimethacrylate
PU=polyurethane
PEU=polyethylenically unsaturated
EETS=beta-3,4-(epoxycyclohexyl)ethyltrimethoxysilane

We claim:

1. An adhesive composition comprising a uniform mixture of
(a) a polyurethane resin,
(b) about 25% to about 200%, of the stoichiometric equivalent weight of (a), of a diamine curing agent,
(c) a compound selected from the group consisting of a diglycidyl ester, a diglycidyl ether, a monoethylenically unsaturated monoglycidyl ester and a monoethylenically unsaturated monoglycidyl ether, the ratio of (c) to (a) ranging from about 1:2 to about 1:16, respectively,
(d) from about 0.1% to about 10.0%, by weight, based on the total weight of (a), (b), (c) and (d) of a glycidoxyalkyltrialkoxysilane, and
(e) from about 0.1% to about 20%, by weight, based on the total weight of (a), (b), (c), (d) and (e) of a polyethylenically unsaturated monomer.

2. An adhesive composition according to claim 1 wherein (b) is 4,4′-methylene-bis-2-orthochloroaniline.

3. An adhesive composition according to claim 1 wherein (c) is glycidyl methacrylate.

4. A composition according to claim 1 wherein (d) is gamma-glycidoxypropyltrimethoxysilane.

5. A composition according to claim 1 wherein (e) is trimethylolpropane trimethacrylate.

6. A unitary structure composed of at least two metal layers, said layers being bonded with the adhesive composition of claim 1.

7. A unitary structure according to claim 6 wherein (c) is glycidyl methacrylate, (d) is gamma-glycidoxypropyltrimethoxysilane and (e) is trimethylolpropane trimethacrylate.

8. A unitary structure comprising at least two metal layers, said layers being bonded with an adhesive composition comprising a uniform mixture of
(a) a polyurethane resin,
(b) about 25% to about 200%, of the stoichiometric equivalent weight of (a), of a diamine curing agent,
(c) a compound selected from the group consisting of a diglycidyl ester, a diglycidyl ether, a monoethylenically unsaturated monoglycidyl ester and a monoethylenically unsaturated monoglycidyl ether, the ratio of (c) to (a) ranging from about 1:2 to about 1:16, respectively, and
(d) from about 0.1% to about 10.0%, by weight, based on the total weight of (a), (b), (c) and (d) of a glycidoxyalkyltrialkoxysilane.

9. A unitary structure according to claim 8 wherein (d) is gamma-glycidoxypropyltrimethoxysilane.

References Cited

UNITED STATES PATENTS

| | | | |
|---|---|---|---|
| 2,946,701 | 7/1960 | Plueddemann | 260—348 |
| 3,309,261 | 3/1967 | Schiller et al. | 260—824 |

FOREIGN PATENTS

| | | |
|---|---|---|
| 834,326 | 5/1960 | Great Britain. |

OTHER REFERENCES

Bodnar et al.: "Adhesive Age," vol. 2, No. 4, April 1959, pp. 29–33.

GEORGE F. LESMES, *Primary Examiner.*

SAMUEL H. BLECH, *Examiner.*